(12) United States Patent
Goodman et al.

(10) Patent No.: US 7,937,549 B2
(45) Date of Patent: May 3, 2011

(54) STORAGE SYSTEM AND SUBSYSTEM TO AUTOMATICALLY DETECT HARDWARE CONFIGURATION CHANGES

(75) Inventors: Brian G. Goodman, Tucson, AZ (US); Frank D. Gallo, Tucson, AZ (US); Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/946,039

(22) Filed: Sep. 21, 2004

(65) Prior Publication Data
US 2006/0064542 A1    Mar. 23, 2006

(51) Int. Cl.
*G06F 13/00*    (2006.01)
(52) U.S. Cl. ..... 711/170; 700/214; 700/215; 369/30.31; 713/1; 713/100
(58) Field of Classification Search .................. 711/170; 700/214, 215; 702/105; 369/30.31; 713/1, 713/100
See application file for complete search history.

(56) References Cited

U.S. PATENT DOCUMENTS

| | | | |
|---|---|---|---|
| 5,980,078 A | 11/1999 | Krivoshein et al. | |
| 6,115,648 A | 9/2000 | Gallo | |
| 6,185,165 B1 | 2/2001 | Jesionowski et al. | |
| 6,205,093 B1 | 3/2001 | Abbott et al. | |
| 6,473,706 B1 * | 10/2002 | Gallo et al. | 702/105 |
| 6,512,963 B1 | 1/2003 | Felde et al. | |
| 6,567,904 B1 * | 5/2003 | Khandekar et al. | 711/170 |
| 7,363,260 B1 * | 4/2008 | Stamler et al. | 705/28 |
| 2002/0169903 A1 | 11/2002 | McIntosh | |

* cited by examiner

*Primary Examiner* — Hetul Patel
(74) *Attorney, Agent, or Firm* — Law Office of Charles W. Peterson, Jr.; Kurt P. Goudy, Esq.

(57) ABSTRACT

A storage subsystem, method of automatically maintaining the subsystem hardware configuration up to date and program product therefor. The storage subsystem automatically initiates hardware discovery in response to a triggering event. Subsystem hardware information is collected during hardware discovery and checked against a current configuration to identify hardware changes. Whenever hardware changes are identified, the subsystem configures the hardware and calibrates newly configured hardware. So, hardware changes may be automatically discovered, configured and calibrated free from operator intervention.

17 Claims, 3 Drawing Sheets ical STORAGE SYSTEM AND SUBSYSTEM TO
AUTOMATICALLY DETECT HARDWARE
CONFIGURATION CHANGES

CROSS REFERENCE TO RELATED APPLICATION

The present invention is related to a U.S. Pat. No. 6,973,509 entitled "Automatic Frame Identification, Door Status, And Frame Count Detection System" to McIntosh et al., filed May 14, 2001, issued May 6, 2003 U.S. Pat. No. 6,950,723 entitled "Method, System, and Program for Virtualization of Data Storage Library Addresses" to Lee G. Jesionowski et al., filed Aug. 22, 2003, issued Sep. 27, 2005, and U.S. patent application Ser. No. 10/741,724, entitled "Global Positioning System Location Information for an Automated Data Storage Library" to Brian G. Goodman et al., filed Dec. 18, 2003, published Jun. 23, 2005 as Published Application No. 2005/0137742, all assigned to the assignee of the present invention.

BACKGROUND OF THE INVENTION

1. Field of the Invention

The present invention is related to a mass storage device and more particularly to a mass storage device with removable storage media and methods of configuring the mass storage device.

2. Background Description

Data storage systems administering data stored on removable storage media, such as an automated storage media (e.g., magnetic tape in tape cartridges) and retrieval library for storing and accessing removable storage media, are well known in the art. Typically, a data storage subsystem may include a number of frames, each with storage media volumes in storage cells that are accessible by an operator through a door in the particular frame. U.S. Pat. No. 6,473,706 entitled "Self-Configuring And Self-Calibrating Automated System" to Gallo et al., issued Oct. 29, 2002, describes a self-configured subsystem embodying a data library. Whenever an operator updates or expands the library subsystem, e.g., adding, replacing or removing components, an operator or user informs the library subsystem of any new hardware and the operator must confirm detected changes. Once the changes are confirmed, the library subsystem performs logical configuration, with the operator providing and confirming detailed logical configuration changes. After confirming all changes, the library subsystem automatically calibrates any new hardware. Unfortunately, such a typical state of the art library, still is not completely automatic and requires operator intervention.

Thus, there is a need for a storage subsystem that is capable of non-intrusive automatic configuration without requiring operator intervention such that changing storage subsystem configuration (e.g., adding a frame) does not disrupt storage subsystem operation.

SUMMARY OF THE INVENTION

It is a purpose of the invention to improve storage subsystem overall performance;

It is another purpose of the invention to reduce disruptions to storage subsystem availability;

It is yet another purpose of the invention to reduce operator involvement in storage subsystem modifications;

It is yet another purpose of the invention to automatically detect storage subsystem changes and automatically update the subsystem for detected changes without operator input or control.

The present invention relates to a storage subsystem, method of automatically maintaining the subsystem hardware configuration up to date and program product therefor. The storage subsystem automatically initiates hardware discovery in response to a triggering event. Subsystem hardware information is collected during hardware discovery and checked against a current configuration to identify hardware changes. Whenever hardware changes are identified, the subsystem configures the hardware and calibrates newly configured hardware. So, hardware changes may be automatically discovered, configured and calibrated free from operator intervention.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
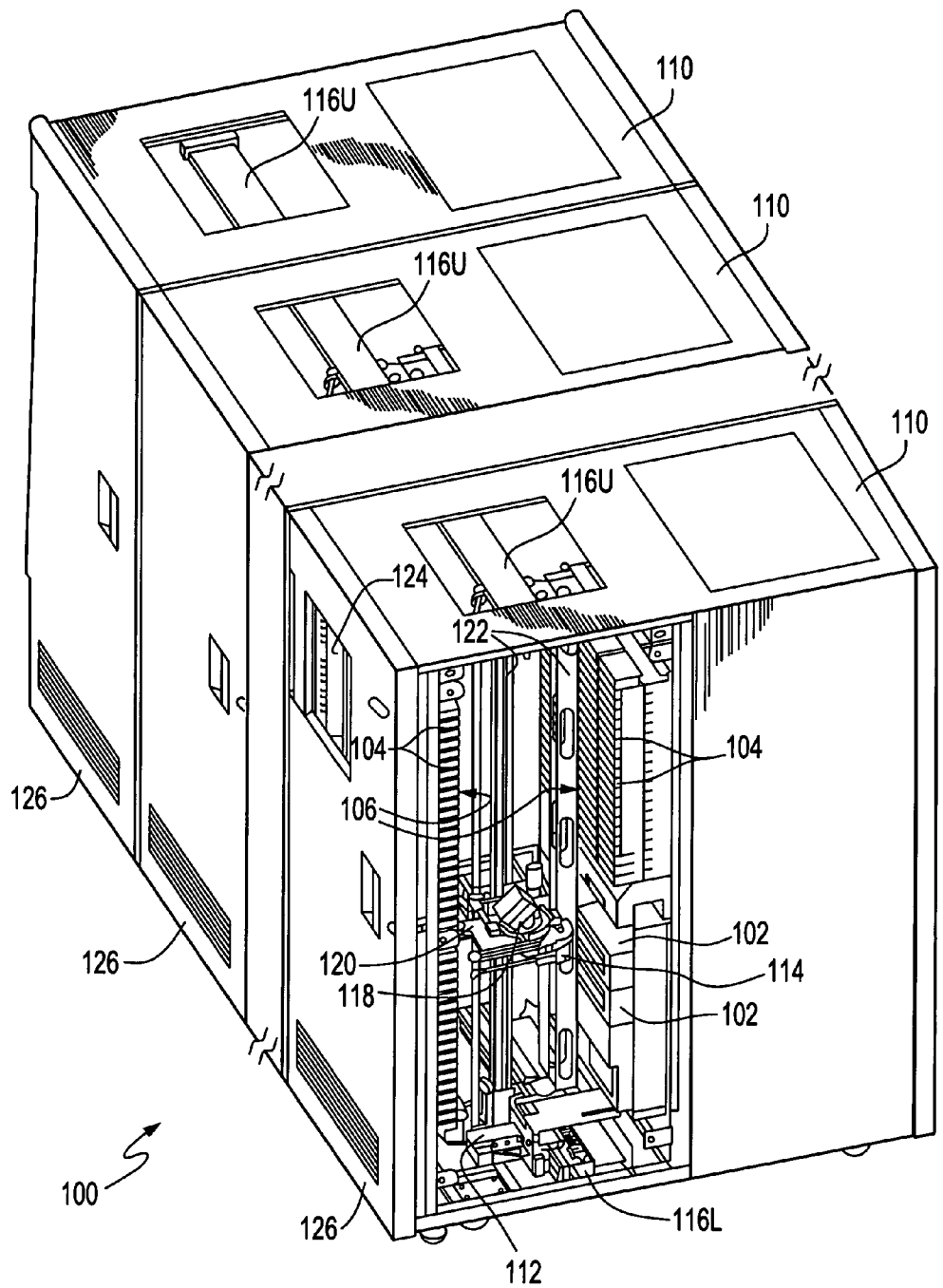
FIG. 1 shows an example of a multi-frame, preferred data storage subsystem that automatically detects subsystem changes in accordance with the present invention.

FIG. 1 shows an example of a preferred data storage subsystem 100 with removable storage media (e.g., magnetic tape in tape cartridges) that automatically detects subsystem changes and configures itself for such changes. For simplicity of description and for example only, the present invention is described with reference to a tape cartridge storage subsystem 100, e.g., an IBM 3494 Tape Library Dataserver (IBM 3494). However, the present invention has application to any suitable storage subsystem with an automated storage media and retrieval library for storing and accessing storage media located within the subsystem. Further, storage media may be magnetic storage media such as magnetic tape and magnetic disk, optical storage media such as compact disk (CD) and digital versatile disk (DVD), electronic storage media such as swappable flash electrically programmable read only memory (flash EPROM) or any suitable equivalent non-volatile removable storage media.

So, the data storage subsystem 100 in this example includes one or more drive units 102 for reading and/or writing data on the physical volumes 104. As noted hereinabove and depending upon the particular storage media, the drives 102 can be any removable media drive unit that is suitable for the particular storage media, e.g., optical disk drives or magnetic disk or tape drives. Correspondingly, the physical volumes 104 can be cartridges or cassettes containing optical or magnetic media (e.g., magnetic tape) or any other suitable removable media and associated drives. Typically, a single physical volume 104 can be individually addressed and accessed by a physical/logical location or a volume serial number, and a number of physical volumes or media cartridges 104 may be stored in storage cells in a storage rack 106. The subsystem 100 includes one or more frames 110.

An automated system actuator assembly (at least one) including an accessor 112 and gripper 114, is slidably mounted on horizontal upper and lower rails 116U, 116L. The accessor 112 transports a selected physical volume 104 between storage cells in storage racks 106 and between the storage racks 106 and the drives 102. The cartridge gripper 114 grips and holds the selected physical volume 104 during transport. A bar code scanner 118, or suitable equivalent identification unit, is mounted on the gripper 114 to "read" labels identifying, e.g., frames, cells or slots within the frames and, cartridges within the slots with a corresponding volume serial number. A calibration sensor 120 is located on the gripper 114 with the bar code scanner 118. Lower rails 116L position the accessor 112 horizontally with respect to the storage rack 106. A vertical rail (a barber pole shaft (not shown)) and guide 122 position the gripper 114 vertically with respect to the storage rack 106. An input/output (I/O) station 124 may be included in one of the frame doors 126, e.g., for manual (operator) input and output of removable media, e.g., for 10-20 cells.

Drives 102, storage slot shelves 106, frames 110, accessor 112, grippers 114, I/O stations 124 and etc., may be added, removed and/or swapped without taking a preferred subsystem 100 off line to update the configuration. Instead, a preferred subsystem 100 automatically checks for hardware changes with the checks masked behind a normal or more routine subsystem operation that is otherwise unaffected by the system configuration checks. Invocation of these routine operations act as triggering events. Suitable triggering events may include, for example, a power-on, a partial or full subsystem reset, a door-open or door-close condition, a library inventory, an accessor re-zero, or entering a subsystem ready or not-ready state. These trigger events may occur through physical interaction with the library. For example, a library door may be closed or the power switch of the library may be turned on. Alternatively, these trigger events may occur through the use of a library interface, either locally or remotely. For example, a user may select a library inventory operation from a web user interface. In another example, a user may cause a partial or complete library reset by selecting a reset option on a web user interface.

So upon occurrence of a triggering event a preferred subsystem 100 automatically checks for configuration changes, e.g., the presence of new hardware, without operator intervention to effect each configuration update/change. For example, the subsystem 100 may automatically collect current frame serial numbers and product model numbers from bar code labels on each frame of the library to determine whether hardware configuration changes have occurred, e.g., frames or storage slots have been added, removed or replaced, or frames have been converted from one to another type. Thus, the subsystem 100 hides hardware discovery operations behind trigger events or other more routine library operations.

After completing hardware discovery, the preferred embodiment subsystem 100 checks collected hardware information against a current configuration for subsystem changes, e.g., for additions, removals and/or substitutions. Only upon identifying changes does the preferred subsystem 100 self-configure and self-calibrate the hardware, to bring new hardware on-line for customer use. So, whenever hardware changes are discovered, the preferred embodiment subsystem 100 automatically discovers and updates/changes the library configuration to reflect those changes; and thereafter, automatically makes any new hardware available for use by the library. Further, hardware changes are non-disruptively folded in to avoid problems that are otherwise suffered from such changes, e.g., where the library queue contains commands that require hardware that has been removed.

Figure 2:
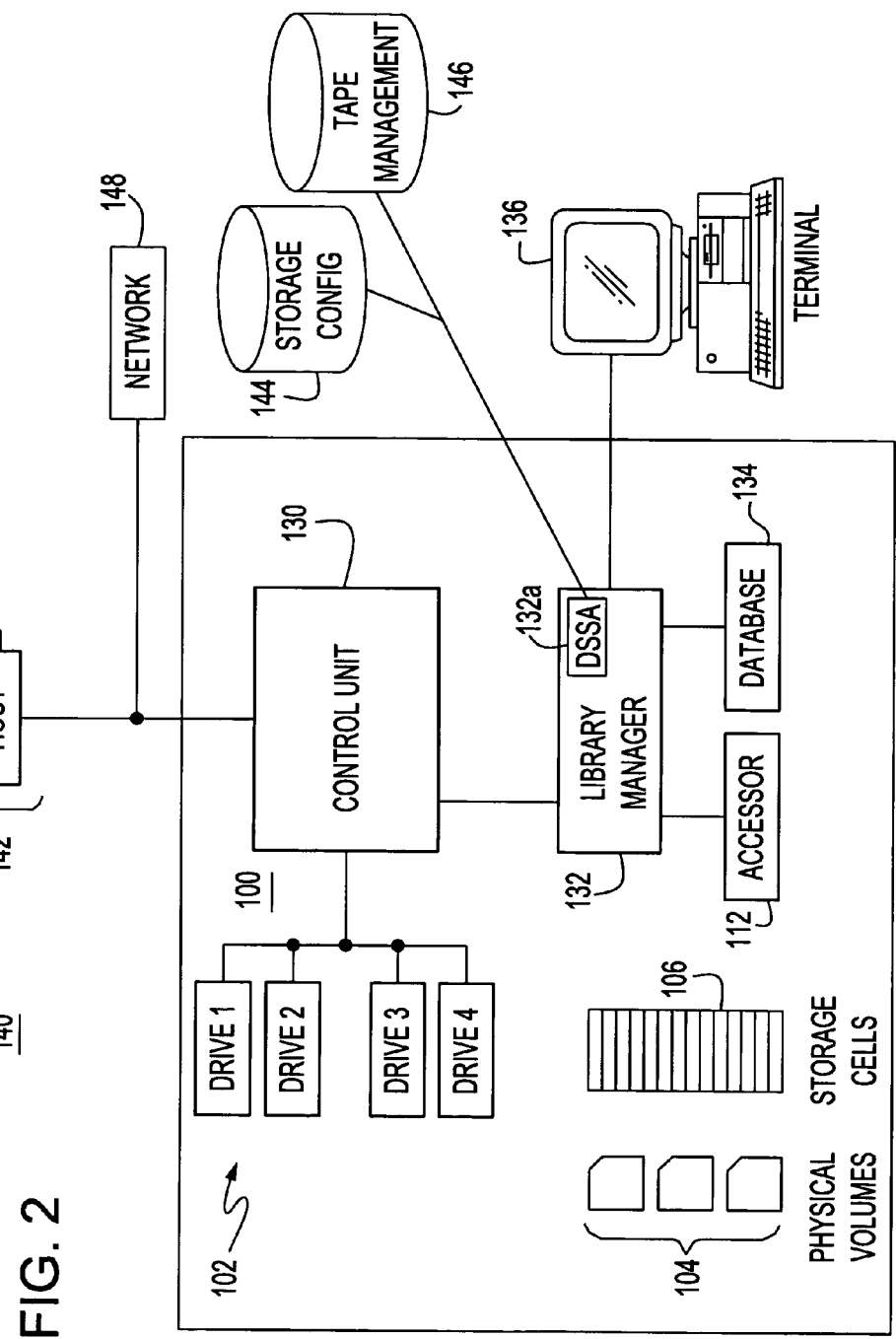
FIG. 2 shows an example of a block diagram of a preferred data storage system including a preferred data storage subsystem in accordance with the present invention.

FIG. 2 shows a block diagram example of a preferred data storage system 140 including a preferred data storage subsystem 100, such as in the example of FIG. 1 with like elements labeled identically and, additionally connected to one or more host systems 142. The data storage subsystem 100 includes a control unit 130 and library manager (LM) 132. Preferably, the control unit 130 and library manager 132 are in software or firmware, e.g., in flash EPROM, running on a typical general purpose processor or processors, microprocessor(s) or embedded processor(s). The control unit 130 and library manager 132 cooperatively control drive load/unload and related actions of drives 102 and the library manager 132 controls the accessor 112. A library manager database 134 stores tables that locate physical volumes 104 in the storage cells. The library manager 132 uses the library manager database 134 for controlling the accessor 112 in retrieving each selected physical volume 104 from its storage cell. An operator console 136 may be provided to allow an operator to communicate with the library manager 132.

Previously, an operator would take a prior art subsystem off-line and initiate a check for configuration changes through the operator console 136. However, upon the occurrence of a trigger event, a preferred library manager 132 checks for hardware configuration changes, e.g., using a typical state of the art method to detect any such hardware changes. So, instead of performing these checks off-line and under user control, the library manager 132 hides hardware discovery behind a library inventory operation, for example, seamlessly discovering changes and updating the subsystem 100 configuration.

Each host system 142 sends requests through the control unit 130 to the library manager 132. A preferred library manager 132 includes a data storage system administrator 132A that may be a system administration program managing a storage (e.g., tape) configuration database 144 and a tape management systems database 146, both of which may be centrally located, e.g., with the library manager 132, or distributed amongst connected systems or host systems 142. Also, optionally, the host system 142 connects over a network 148 to other networked devices (not shown). The storage configuration database 144 includes a system volume catalog of other data relating to the volumes that the data storage system administrator 132A uses to manage the volumes coupled to the particular host 142. In addition, the data storage system administrator 132A uses the tape management system database 146 to manage data sets residing on the volumes, including the expiration, owner, access, etc.

Figure 3:
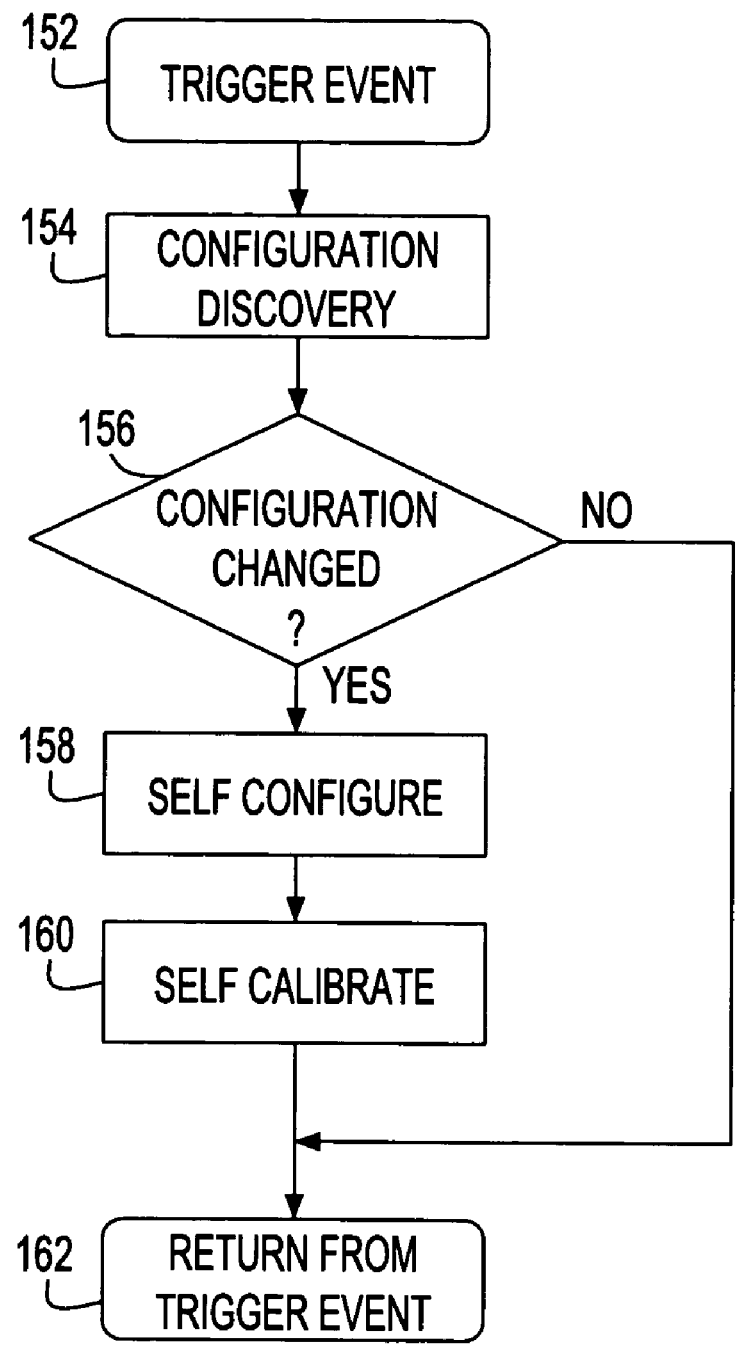
FIG. 3 shows a flow diagram example of automatically recognizing preferred embodiment storage subsystem changes and seamlessly updating subsystem configuration in accordance with the present invention.

FIG. 3 shows a flow diagram example 150 of automatically recognizing changes in a preferred embodiment storage subsystem and seamlessly updating subsystem configuration with reference to the examples of the subsystem 100 of FIGS. 1 and 2. So, in step 152 upon occurrence of a trigger event, in step 154 configuration discovery begins automatically checking hardware for changes, e.g., by collecting information related to current hardware in the subsystem 100. In step 156 the collected information is compared against the current subsystem configuration for changes. If the subsystem 100 determines that the configuration has changed; then, in step 158, the subsystem updates/changes the configuration and in step 160 the new/changed hardware may be calibrated. Once the new/added hardware is calibrated, in step 162 the subsystem 100 returns from the trigger event and continues normal operation, based on its changed/updated configuration. If, however, in step 156 the configuration is unchanged, the subsystem 100 simply returns from the trigger event in step 162 and resumes normal operation.

So, as noted hereinabove the triggering event (152 of FIG. 3) may be for example, power-on, a partial or full subsystem reset, a door-open or door-close condition, a library inventory, or entering a subsystem ready or not-ready state. Additionally, the triggering event 152 may be a re-zero operation or at any time a subsystem door (e.g., 126 in FIG. 1) is opened/closed or during a library inventory operation. So, as with any triggering event 152, the subsystem 100 performs a configuration check in step 154, e.g., performing a frame count using any suitable methods such as those examples provided hereinafter. In particular whenever a door is opened, the subsystem 100 goes off line, presenting an excellent opportunity to automatically configure the library with the discovery step 154, e.g., hidden behind the library inventory. Typically, a door must be opened, for example, to change the configuration of a frame or group of frames.

Any suitable method may be used in step 154 to determine if a hardware change has occurred (e.g., from adding or removing frames), such as by counting the number of frames 110 that are currently present in the library. Examples of suitable frame counting methods include published U.S. Patent Application No. 2002/0169903 entitled "Automatic Frame Identification, Door Status, and Frame Count Detection System" to McIntosh et al., and U.S. patent application Ser. No. 10/741,724, entitled "Global Positioning System Location Information for an Automated Data Storage Library" to Brian G. Goodman et al., filed Dec. 18, 2003, both of which are assigned to the assignee of the present invention and incorporated herein by reference. McIntosh et al. describes a suitable frame counter circuit and Goodman et al. describes Global Positioning System (GPS) based frame location and discovery. Alternately, the subsystem (100 of FIGS. 1 and 2) may determine frame count by moving the accessor 112 the length of the library, e.g., end to end, and then, calculate the number of frames from the distance that the accessor 112 travels. However, these three exemplary methods are provided for example only. Any suitable method may be used to determine whether storage and/or drives have been added or removed. Further, any suitable method for determining frame count that reduces the risk of falsely detecting hardware changes may be used.

So, for example, during a library inventory a current frame count is taken to determine if any frames 110 have been added or removed. If the current number of frames 110 is different than the number of frames 110 for which the subsystem 100 is configured, the subsystem 100 has an indication that frames 112 have been added or removed.

Where it may be advantageous to detect replaced frames as well as added or removed frames, in step 154 the subsystem 100 reads unique frame information, for example. Such unique frame information may be provided as frame serial numbers and product model numbers in machine readable form, e.g., from bar code labels on each library frame, RFID tags and etc. Thus, in addition to determining if frames have been added or removed in this example, the subsystem 100 also can determine from this unique frame information whether previously configured hardware has changed, e.g., from swapping or replacing frames 110 or from converting frames 110 from one type to another. If hardware changes are found, then in step 156 the subsystem 100 automatically uses any resulting frame change information in step 158 to update/change the configuration and in step 160 the new/changed hardware may be calibrated. Again, any new hardware may be available for customer use when the subsystem 100 returns from the triggering event in step 162, e.g., after completing a power-on or reset sequence.

In yet another example the subsystem 100 may read cartridge 104 labels or empty cell labels and, optionally, for multiple drives 102. From the label information the subsystem 100 can determine if expected hardware matches actual, e.g., storage is absent/present in locations where it is not expected. Hardware configuration changes may be detected, for example, using a bar code scanner 118 reading cartridge 104 labels or labels at the back of empty storage slots to detect the presence/absence of data storage cartridges 104 or available storage slots. U.S. Pat. No. 6,512,963 B1 entitled "Library System Having Empty Cartridge Storage Cell Coded Label Stripe" to Felde et al. describes one suitable method of determining if a storage slot is empty. Also, U.S. Pat. No. 6,185,165 B1 entitled "Positionable Vision Indicators for Configuring Logical Libraries" to Jesionowski et al. provides a suitable method of indicating available storage slots, especially when multiple storage slots are associated with a common bar code label. Other ways that available slots or swapped/replaced cartridges 104 may be identified include providing a radio frequency identification (RFID) reader or a presence sensor on the accessor 112. In yet another approach, a library/drive communication interface may be checked to identify potential storage and drive location changes, e.g., with a presence sensor check. For example, a suitable library/drive communication interface includes features that indicate whether drives or storage is present, or that nothing is present, i.e., to determine if storage or drives have been added or removed from a frame.

Once the configuration changes have been identified in step 156, updating the configuration in step 158 and, optionally calibrating changed hardware in step 160, need not occur immediately and may be scheduled for a more convenient, non-disruptive period, such as a subsequent trigger event, e.g., at the next power on. For example, any previously unavailable storage slots that are available, i.e., newly installed, may be reported to the host computer as inaccessible in the library inventory data. In addition, any newly added storage may be masked out of the inventory data and ignored until the occurrence of such a more convenient, non-disruptive period, when the subsystem 100 may include the new storage in the inventory. Also, subsystem 100 configuration changes may be made immediately after an inventory operation completes in a subsystem capable of virtualization, such as described in U.S. patent application Ser. No. 10/646,234, entitled "Method, System, and Program for Virtualization of Data Storage Library Addresses" to Lee G. Jesionowski et al., filed Aug. 22, 2003, assigned to the assignee of the present invention and incorporated herein by reference. Accordingly, since hardware discovery 154 is hidden behind the subsystem response to the trigger event 152, and since both self-configuration 158 and self-calibration 160 are both also hidden behind the same or a subsequent trigger event 152; configuration changes are folded into normal subsystem operation and, so, avoid disrupting subsystem operation, e.g., by going off-line for configuring and calibrating the library or because a command in the library queue that requires hardware that has been removed.

Thus, advantageously, upon occurrence of a triggering event 152, a preferred embodiment data storage subsystem 100 automatically checks for configuration changes, e.g., the presence of new hardware, without operator intervention. Hardware discovery operations 154 are hidden behind trigger events or other more routine library operations. So, whenever hardware changes are discovered, the preferred embodiment subsystem 100 automatically discovers and updates/changes the library configuration to reflect those changes; and thereafter, automatically makes any new hardware available for use by the library. Accordingly, hardware changes are non-disruptively folded in to avoid problems that are otherwise suffered from such changes, e.g., where the library queue contains commands that require hardware that has been removed. Host time outs may be avoided by distributing the reconfiguration over a number of triggering events.

While the invention has been described in terms of preferred embodiments, those skilled in the art will recognize that the invention can be practiced with modification within the spirit and scope of the appended claims.

What is claimed is:

1. A method of automatically keeping a storage subsystem configuration up to date, said method comprising:
    automatically configuring a storage subsystem and storing a current configuration of said storage subsystem;
    beginning normal subsystem operation;
    conducting a library inventory including configuration discovery of hardware included in said storage subsystem responsive to each normal operation triggering event, said configuration discovery collecting information indicating current storage subsystem hardware, comparing configuration discovery results against the stored said current configuration and responsive to said results matching said stored configuration continuing normal subsystem operation;
    changing hardware on said storage subsystem, said stored current configuration remaining unchanged;
    continuing normal subsystem operation until the occurrence of a next normal operation triggering event prior to occurrence of a system power-off or full system reset, wherein the normal operation triggering event consists of the occurrence of one of a partial subsystem reset, an accessor re-zero operation, a door-open condition, a door-close condition, beginning a library inventory, entering a subsystem ready state and entering a subsystem not-ready state;
    conducting a library inventory including configuration discovery responsive to said next normal operation triggering even;
    determining from said configuration discovery any changes to storage subsystem hardware;
    configuring said storage subsystem and providing an updated configuration, said updated configuration replacing the stored configuration, said stored configuration being automatically kept up to date free from operator intervention and hidden during normal subsystem operation by said inventory; and
    continuing normal subsystem operation until a next hardware change and the occurrence of a next operation triggering event, and then returning to conducting a inventory.

2. The method of automatically keeping a storage subsystem configuration up to date as in claim 1, wherein the configuration discovery comprises determining if a number of subsystem frames has changed.

3. The method of automatically keeping a storage subsystem configuration up to date as in claim 1, wherein the configuration discovery comprises determining if any one of a number of subsystem frames has been replaced.

4. The method of automatically keeping a storage subsystem configuration up to date as in claim 1, wherein the configuration discovery comprises examining storage cell presence.

5. The method of automatically keeping a storage subsystem configuration up to date as in claim 1, wherein said partial subsystem reset comprises a partial or complete library reset and configuring said storage subsystem, further comprises waiting for a subsequent non-disruptive period.

6. The method of automatically keeping a storage subsystem configuration up to date as in claim 5, wherein a user causes a partial or complete library reset by selecting a reset option on a web user interface and said subsequent non-disruptive period is a subsequent said normal operation triggering event.

7. The method of automatically keeping a storage subsystem configuration up to date as in claim 1, before returning to continue normal operation, said method further comprising:
    calibrating said storage system responsive to said updated configuration.

8. A computer program product for automatically maintaining up to date a configuration of a storage subsystem without disrupting normal subsystem operation, said computer program product comprising a computer usable medium having computer readable program code thereon, said computer readable program code comprising:
    computer readable program code means for storing a configuration of a storage subsystem;
    computer readable program code means for automatically identifying a normal operation triggering event during normal subsystem operation and prior to occurrence of a system power-off or full system reset, wherein said normal operation triggering event consists of the occurrence of one of a partial subsystem reset, an accessor re-zero operation, a door-open condition, a door-close condition, a library inventory, entering a subsystem ready state and entering a subsystem not-ready state;
    computer readable program code means for discovering hardware included in said storage subsystem during normal subsystem operation responsive to each occurrence of any said normal operation triggering event;
    computer readable program code means for comparing discovered said hardware against a stored said configuration, a difference between said discovered hardware and said stored configuration indicating a discovered hardware change; and
    computer readable program code means for configuring said storage subsystem responsive to discovered hardware changes and providing an updated configuration hidden during normal subsystem operation.

9. The computer program product for automatically maintaining up to date a configuration of a storage subsystem as in claim 8, wherein the computer readable program code means for discovering hardware comprises:
    computer readable program code means for checking storage frames in said storage subsystem, said configuration having an expected number of said storage frames, said expected number being compared against a number of said storage frames found in said storage subsystem.

10. The computer program product for automatically maintaining up to date a configuration of a storage subsystem as in claim 8, wherein the computer readable program code means for discovering hardware comprises:
    computer readable program code means for checking a unique frame identification in each found one of said storage frames said configuration having an expected said unique frame identification for said each found one, each checked said unique frame identification being checked against said expected unique identification, any unmatched said unique frame identification indicating a discovered hardware change.

11. The computer program product for automatically maintaining up to date a configuration of a storage subsystem as in claim 8, wherein the computer storage cells, any change in storage cell presence indicating a discovered hardware change.

12. The computer program product for automatically maintaining up to date a configuration of a storage subsystem as in claim 8, wherein said partial subsystem reset comprises a partial or complete library reset and the computer readable program code means for automatically identifying a normal operation triggering event during normal subsystem operation comprises:

computer readable program code means for receiving user input selecting a reset option on a web user interface causing a partial or complete library reset.

13. A storage subsystem for storing and administering data, said storage subsystem automatically maintaining subsystem hardware configuration up to date without disrupting normal subsystem operation, said storage subsystem comprising:

a plurality of storage frames, one or more of said storage frames contain physical storage in a data library;

a configuration storage storing a current storage subsystem configuration;

a library manager managing said data library, said library manager conducting a library inventory responsive to every occurrence of a normal operation triggering event prior to occurrence of a system power-off or full system reset, wherein said library manager recognizes any one of a partial subsystem reset, an accessor re-zero operation, a door-open condition, a door-close condition, said library inventory, entering a subsystem ready state and entering a subsystem not-ready state, said library inventory including a configuration discovery to identify changes to storage subsystem hardware; and an accessor moving amongst said plurality of storage frames under control of said library manager, results of said configuration discovery being provided to said library manager responsive to movement by said accessor, said storage subsystem being re-configured responsive to said results indicating hardware changes from a current stored storage subsystem configuration, said hardware changes being automatically discovered and an updated configuration being provided and replacing said current storage subsystem configuration in said configuration storage.

14. The storage subsystem as in claim 13, wherein said library manager receives a frame count responsive to said accessor moving amongst said plurality of storage frames.

15. The storage subsystem as in claim 13, wherein said partial subsystem reset is a partial or complete library reset and each of said plurality of storage frames includes a unique identification, during normal subsystem operation each said unique identification number being checked against expected unique identification codes in said current storage subsystem configuration.

16. The storage subsystem as in claim 15, wherein a user causes a partial or complete library reset by selecting a reset option on a web user interface, said storage subsystem further comprising:

a bar code scanner attached to said accessor, during normal subsystem operation said bar code scanner scanning said unique identification at each of said plurality of storage frames and each of said plurality of physical storage volumes.

17. The storage subsystem as in claim 13, wherein during normal subsystem operation the presence of storage cells is counted during said configuration discovery, any change in storage cell count causing an update of said configuration.

\* \* \* \* \*